United States Patent [19]

Nakase et al.

[11] Patent Number: 4,868,692
[45] Date of Patent: Sep. 19, 1989

[54] TRACKING ERROR SIGNAL FORMING CIRCUIT

[75] Inventors: Hiromi Nakase, Osaka; Kanji Kubo; Hiroshi Taniguchi, both of Hirakata; Mitsunobu Furumoto, Yao, all of Japan

[73] Assignee: Matsushita Electric Industrial Co., Ltd., Osaka, Japan

[21] Appl. No.: 174,399

[22] Filed: Mar. 28, 1988

[30] Foreign Application Priority Data

Mar. 31, 1987 [JP] Japan .................................. 62-77751
Jul. 22, 1987 [JP] Japan ................................. 62-182493

[51] Int. Cl.$^4$ ............................................. G11B 5/592
[52] U.S. Cl. ................................ 360/77.16; 360/77.13
[58] Field of Search ............. 360/21, 84, 77.13, 77.14, 360/77.16, 77.17, 76

[56] References Cited

U.S. PATENT DOCUMENTS

| 3,964,094 | 6/1976 | Hart | 360/77.13 |
| 4,166,282 | 8/1979 | Ragle et al. | 360/77.11 |
| 4,184,181 | 1/1980 | Mijatori/ | 360/77.13 |
| 4,482,928 | 11/1984 | Moriya et al. | 360/77.13 |
| 4,542,415 | 9/1985 | Kimura | 360/77.08 |
| 4,561,028 | 12/1985 | Guisinger | 360/77.04 |

FOREIGN PATENT DOCUMENTS 55-150129 11/1980 Japan .
56-159858 12/1981 Japan .
57-198566 12/1982 Japan .
58-118074 7/1983 Japan .
60-256948 12/1985 Japan .

Primary Examiner—Alan Faber
Assistant Examiner—David L. Robertson
Attorney, Agent, or Firm—Stevens, Davis, Miller & Mosher

[57] ABSTRACT

A tracking error signal forming circuit is disclosed, which circuit comprises means for obtaining a reproduction time difference between specified signals, each of which is contained in the reproduced signal reproduced by each of at least two heads having different azimuthal angles and mounted on an electro-mechanical converting element; reference value forming means for forming a reference value for the tracking control, operating means for calculating the difference between the reproduction time difference and the reference value or the sum thereof; displacement means for displacing forcedly the electro-mechanical converting element in the positive or negative direction; and maximum value detecting means for detecting the maximum value of at least one of the reproduced signals; the reference value forming means including means for calculating the difference between the reproduction time difference and the fixed reference value or the sum thereof at the point of time at which the maximum value of the reproduced signal is obtained by the maximum value detecting means.

16 Claims, 15 Drawing Sheets

FIG. 1
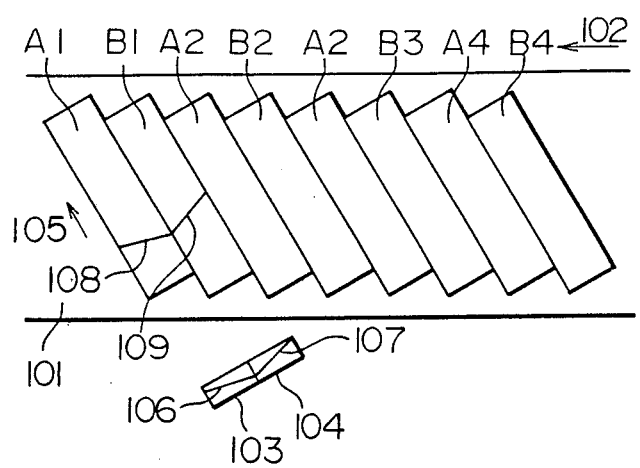
FIG. 2-a ORIGINAL SIGNAL
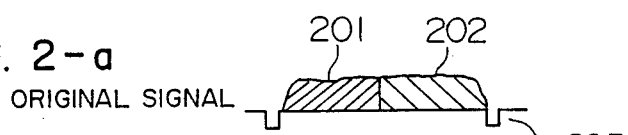
FIG. 2-b RECORDING SIGNAL
FIG. 2-c RECORDING SIGNAL
FIG. 3-a  FIG. 3-b  FIG. 3-c
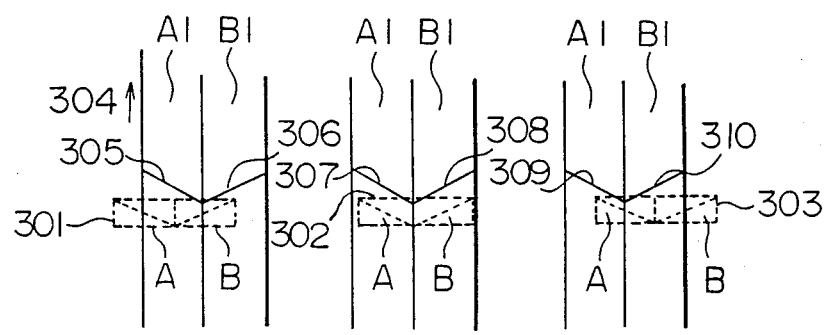

FIG. 4
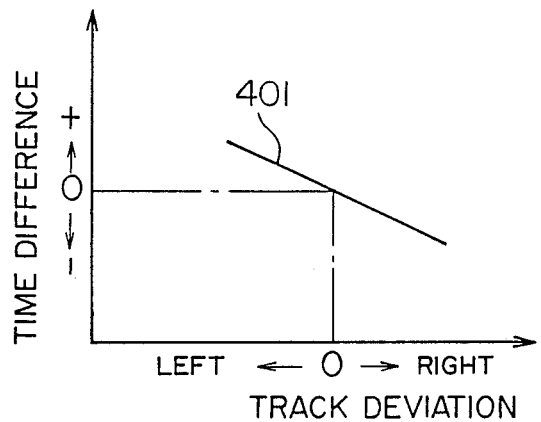
FIG. 5-a    FIG. 5-b
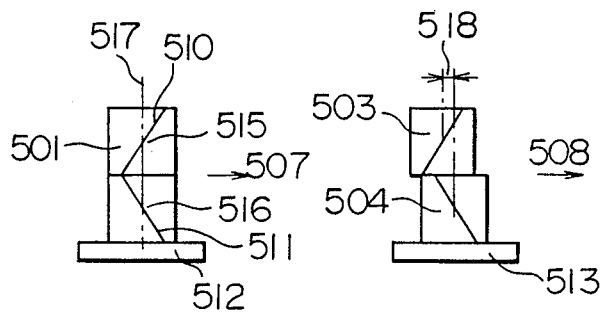
FIG. 5-c
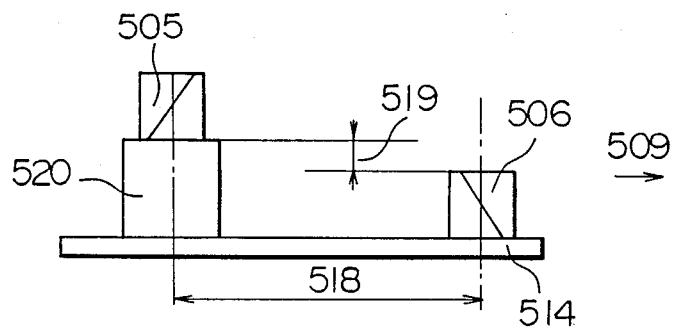

TRACKING ERROR SIGNAL FORMING CIRCUIT

BACKGROUND OF THE INVENTION

This invention relates to a tracking error signal forming circuit and a method for obtaining a tracking error signal, in particular by using a reproduction time difference between signals reproduced by at least two heads having different azimuthal angles.

In a recording/reproduction apparatus, e.g. a magnetic recording/reproduction apparatus (hereinbelow called simply VTR), etc., when information signals recorded on a recording track are reproduced, the tracking control is necessary in order that the play back head reproduces the recorded signals by scanning just on the recording track.

As a method utilized in practice for the tracking control there is known a method, by which a track exclusively used for the tracking control is disposed along the longitudinal direction of the tape, in which control signals are recorded with the frame period on a period, which is an integer times as long as it, at the recording of image signals and the tracking control is effected by using these control signals at the reproduction. However, this method has a drawback that the track exclusively used for the tracking control is necessary and that it is impossible to obtain tracking error signals over the whole region of the recording track.

As another method used in practice there is known a method, by which pilot signals for the tracking control are recorded on the recording track and at the reproduction tracking error signals are obtained by comparing reproduction levels of the pilot signals reproduced from each track adjacent to the main track, which the head is scanning and reproducing. According to this method, since it is possible to obtain tracking error signals over the whole region of the recording track, when the play back head is mounted on an electromechanical converting element constituted by a piezoelectric element, etc. and the mechanical position of the head is varied by using the tracking error signals described above, it is possible to construct a control system capable of following bending of the track. However this method has a drawback that, since it is necessary to record the pilot signals, superposing them on the information signal, the bandwidth of the information signal is reduced by the bandwidth corresponding to that of the pilot signals and therefore S/N of the information signal is worsened correspondingly.

In order to remove these drawbacks, a method has been proposed, by which the tracking error signals are obtained over the whole region of the recording track without using pilot signals. The method is disclosed in JP-A-55-150129 and by the method the relationship between the track deviation and the reproduction time difference between reproduced by at least two heads having different azimuth angles is used. Since this invention relates to the method, fundamental conception of the method will be explained below.

FIG. 1 shows magnetization trajectories recorded by two heads having different azimuthal angles. In the figure 101 is a magnetic tape, which is forward in the direction indicated by an arrow 102. 103 and 104 indicate two heads having azimuthal angles, which are different from each other. They scan the tape simultaneously in the direction indicated by an arrow 105. Such heads, i.e. two heads, which scan the magnetic tape simultaneously and have azimuthal angles, which are different from each other, are called below a pair head. 106 and 107 indicate head gaps in the head, respectively. A1, A2, A3, ... are magnetization trajectories recorded by heads having the same azimuthal angle as the A head indicated by 103 and B1, B2, B3, ... are magnetization trajectories recorded by heads having the same azimuthal angle as the B head indicated by 104. The pair of tracks A1, B1 and the pair of tracks A2, B2 may be recorded either by a same pair head or by another pair head. This relation is determined by the number of rotations of the rotating cylinder, in which magnetic heads are integrated, and the number of pair heads integrated therein, which can be arbitrarily decided at the design of the device. The signal on each of the magnetization trajectories, e.g. magnetization pattern of the horizontal synchronization signal, etc. is recorded with an angle inclined to the longitudinal direction of the track, as indicated by 108 and 109, i.e. an azimuthal angle.

The method for recording/reproducing information signals by means of a pair head is efficient, when the frequency band of the information signal to be dealt with is great. This is because, since at recording information signals with a constant head scanning speed, the higher the recording frequency of the information signal is, the shorter the wavelength recording it on the magnetic tape is and the shorter it is, the more difficult the practical recording/reproduction is, but it is possible to divide the frequency band of the information signal, the recording wavelength can be set to be substantially long.

FIG. 2 shows the conception, by which the information signal to be recorded is divided into two kinds of signals. FIG. 2-a indicates the original signal to be recorded and FIG. 2-b and FIG. 2-c indicate signals obtained by dividing the original signal, i.e. real recording signals supplied to the pair head. The original signal is divided in time into two portions 201 and 202, e.g. as indicated in the figure, which are elongated in time as indicated by 203 and 204, respectively. That is, it is possible to narrow the frequency band, corresponding to the elongation in time. In FIG. 2, 205, 206, 207, etc. are timing signals, e.g. horizontal synchronization signals. Further the method for dividing the original signal is not restricted to the method, by which the original signal is divided in time, but a method, by which it is divided in frequency, a method, by which it is divided, depending on the kind of signals such as the brightness signal, the color signal, etc., and so forth are conceivable. In any case, in the case where signals having a wide frequency band are to be recorded, the method using a pair head is efficient in practice and inevitable.

FIG. 3 shows 3 positional relations between the recorded magnetization trajectory and the play back scanning head. In this figure 301, 302 and 303 indicated by broken lines indicate pair heads, each of which consists of an A head and a B head. Each of the pair heads scans a trajectory in the direction indicated by an arrow 304. A1 and B1 are magnetization trajectories recorded by a pair head and signals indicated by 305 to 310 represent recording positions of horizontal synchronization signals. The position of the pair head with respect to the recorded magnetization trajectories is deviated towards left on the sheet of the FIG. 3-a, on-track in FIG. 3-b and deviated towards right in FIG. 3-c. When a recording track is play-back-scanned with heads having such relative positional relations, even if signals are recorded at a same timing, they are reproduced with different timings. For example, in FIG. 3-a, the timing, where the horizontal synchronization signal 305 is reproduced by the head A, is retarded with respect to the timing, where the horizontal synchronization signal 306 is reproduced by the head B; in FIG. 3-b the reproduction timings of the two horizontal synchronization signals are equal; and finally in FIG. 3-c the timing, where the horizontal synchronization signal 309 is reproduced by the head A, is advanced with respect to the timing, where the horizontal synchronization signal 310 is reproduced by the head B. Consequently track deviations can be known by examining the time difference of the horizontal synchronizaton signals reproduced by the heads A and B. Further the signal, for which the time difference is examined, is not restricted to the horizontal synchronization signal, but it may be another specified signal. However this invention will be explained below, supposing that the specified signal is the horizontal synchronization signal.

FIG. 4 is a graph showing the relation between the track deviation and the reproduction time difference between the horizontal synchronization signals reproduced by the heads A and B, in which the abscissa indicates the track deviation, the position indicated by 0 being the on-track position. The direction of the deviation towards right and left corresponds to the direction of the deviation of the head with respect to the recording track on the sheet indicated in FIG. 3. The ordinate indicates the reproduction time difference between the horizontal synchronization signals reproduced by the heads A and B and the timing, where the time difference is 0, corresponds to the on-track position. Further it is supposed that the direction of the deviation is positive, when the timing of the horizontal synchronization signal reproduced by the head A is retarded with respect to that reproduced by the head B. At this time the relation between the track deviation and the time difference between the reproduced signals is represented by a line 401. As it is clear from FIG. 4, if the tracking control circuit is so constructed that the time difference indicated by the ordinate tends to be zero, the play back head play-back-scans the recorded track always on-track.

However the method, by which the tracking control is effected by detecting the time difference between the signals reproduced by the pair head, is difficult, only when the center positions of the head gaps of the heads A and B are strictly in accordance with each other, and otherwise it gives rise to track deviations. This will be explained below.

FIG. 5 illustrates 3 mounting states of the heads A and B. In the figure 501, 503 and 505 indicate the head A and 502, 504 and 506 show the head B. The scanning direction of the heads is indicated by arrows 507, 508 and 509. 512, 513 and 514 represent members for mounting the heads, which are movable members constituted by piezo-electric elements, etc. The heads A and B are mounted so as to be deviated from each other in the direction perpendicular to the scanning direction. The gap in each of the head is indicated by a full line drawn aslant in each of the heads, as indicated by 510 and 511.

FIG. 5-a shows the correct mounting state, in which the center points 515 and 516 of the gaps of the heads are on a line 517, which is perpendicular to the scanning direction of the heads. That is, there are no deviations in the scanning direction. In a magnetization trajectory recorded by using such heads signals havng a same timing are recorded side by side in the direction perpendicular to the longitudinal direction of the recorded track.

FIG. 5-b shows an incorrect mounting state, in which the heads are mounted so that the center points of the gaps thereof are deviated by an amount indicated by 518 from each other in the scanning direction. In a magnetization trajectory recorded by using such a head signals having a same timing are recorded, deviated by the amount indicated by 518 from each other in the longitudinal direction of the recorded track.

FIG. 5-c illustrates another mounting method of the heads, in which the heads are mounted so that the center points of the gaps thereof are shifted by an interval 518 corresponding to the recording wavelength of the horizontal synchronization signal and in addition the amount of the deviation 519 in the height of the heads produced by the shift of the head is corrected by a height correcting member 520. It is well known that it is possible to locate the recording positions of the horizontal synchronization signals side by side in the longitudinal direction of the recorded track by means of the heads thus constructed. However, also in this case, unless the interval 518 is set so as to be precisely equal to the wavelength of the horizontal synchronization signal or a length, which is an integer times as long as the wavelength, the condition is identical to that explained, referring to FIG. 5-b.

FIG. 6 shows the relation between the recorded magnetization trajectory and the play back head, in the case where a magnetization trajectory recorded by a pair head, in which the mounting positions of the heads are deviated from each other, is reproduced by another pair head having also deviated heads. 601 and 602 represent heads A and B, respectively, and 603 and 604 indicate recording positions of the horizontal synchronization signals. The figure shows a state, in which the pair head scans the recorded track, when it is on-track. At this time the time difference between reproduction timings of the two horizontal synchronization signals reproduced by the heads A and B corresponds to a difference between distances indicated by 605 and 606. That is, even if the pair head is on-track, a time difference is produced between the reproduced signals.

FIG. 7 shows the relation between the track deviation and the time difference between the reproduced signals, in which the abscissa and the ordinate have the same meanings as those explained for FIG. 4 and 401 is the characteristic line indicated in FIG. 4. That is, for this characteristic line the time difference zero corresponds to the on-track position. On the other hand the characteristic line indicated by 701 is that obtained, in the case where the relation between the heads and the recorded magnetization track is that indicated in FIG. 6. That is, in this case, the time difference is not zero at the on-track position. If the control were effected so that the time difference is zero at this time, the control system would be stabilized at the track position indicated by 702.

The mounting precision of the heads A and B is determined by the mechanical precision at the head mounting and fluctuations are always produced. Consequently it can be said that the relation between the recording position of the signal and the play back pair head is generally that indicated in FIG. 6. Furthermore, since the relation between the distances indicated by 605 and 606 in FIG. 6 is different from deck to deck, unless this problem is resolved, the method disclosed in JP-A-54-57287 cannot be utilized in practice.

SUMMARY OF THE INVENTION

The object of this invention is to provide a tracking error signal forming circuit, by means of which the on-track position is automatically set, even if the relation between the recording position of the signal on the recorded track and the gaps of the play back pair head is that indicated in FIG. 6.

A tracking error signal forming circuit according to this invention comprises at least two heads having different azimuthal angles and mounted on an electromechanical converting element, means for obtaining a reproduction time difference between specified signals, each of which is contained in the reproduced signal reproduced by each of the heads, reference value forming means for forming a reference value for the tracking control, operating means for calculating the difference between the reproduction time difference and the reference value or the sum thereof, displacement means for displacing forcedly the electro-mechanical converting element in the positive or negative direction, and maximum value detecting means for detecting the maximum value of at least one of the reproduced signals at the displacement of the element, the reference value forming means including means for calculating the difference between the reproduction time difference and the fixed reference value or the sum thereof at the point of time, where the maximum value of the reproduced signal is obtained by the maximum value detecting means.

BRIEF DESCRIPTION OF THE DRAWINGS

FIG. 1 is a scheme showing the relation between a magnetization trajectory and a pair head;

FIGS. 2, a-c, is a scheme for explaining the conception of a method for dividing the signal, when the pair head is used;

FIGS. 3, a-c, shows the relative positional relation between the recorded magnetization trajectory and a playback head;

FIG. 4 shows variations of the tracking error signal in the state where the pair head is mounted correctly;

FIGS. 5, a-c, shows various mounting states of the heads;

DESCRIPTION OF THE PREFERRED EMBODIMENTS

Before explaining preferred embodiments of this invention, the fundamental conception of this invention will be explained.

Figure 6:
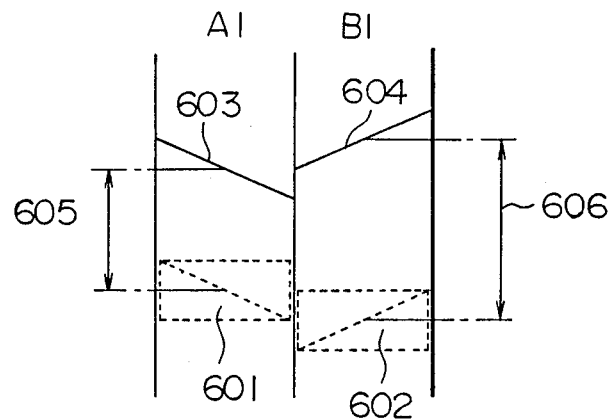
FIG. 6 shows the relative positional relation between a magnetization trajectory recorded by using a pair head in the state where the heads are mounted incorrectly, and a play-back pair head in the state, where the heads are mounted also incorrectly.
Figure 7:
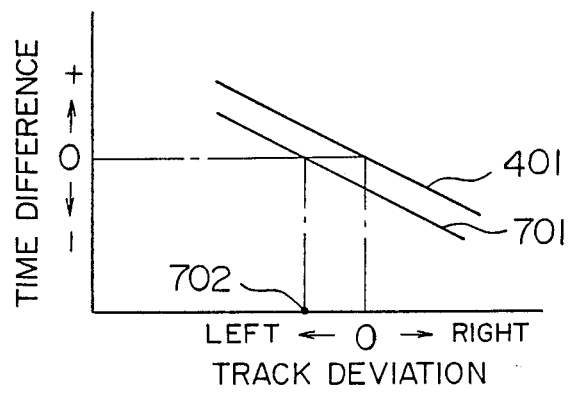
FIG. 7 shows variations of the tracking error signal, when a pair head in the state, where the heads are mounted incorrectly, is used.
Figure 8:
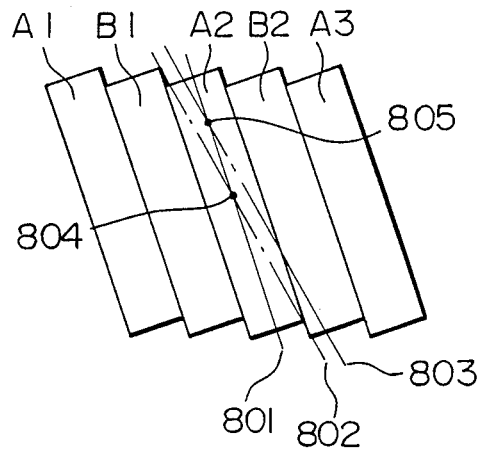
FIG. 8 shows the relation between the recorded magnetizaton trajectory and the head scanning trajectory.

FIG. 8 shows the relation between the recorded magnetization trajectory and the head scanning trajectory and FIG. 9 shows variations in the output level of reproduced signals obtained by the scanning with the pair head indicated in FIG. 8 and the time difference between the reproduced signals with respect to time.

In FIG. 8 A1, A2, . . . indicate magnetization trajectories recorded by the head A and B1, B2, . . . indicate magnetization trajectories recorded by the head B. 801, 802 and 803 represent head scanning trajectories at various states. In order to know variations in the output level of reproduced signals, it is sufficient to examine variations in the output of either one of the heads A and B. Consequently explanation will be made, supposing that the head scanning trajectory described above is the scanning trajectory of the center of the head gap of the head A. 801 represents the head scanning trajectory, when the head is on-track, and 802 and 803 are head scanning trajectories, e.g. when the tape is stopped. The head scanning trajectory at the stopped tape is not always at a constant position with respect to the recorded track, but it has a positional relation indicated e.g. by 802 or 803.

Figures 9A, 9B:
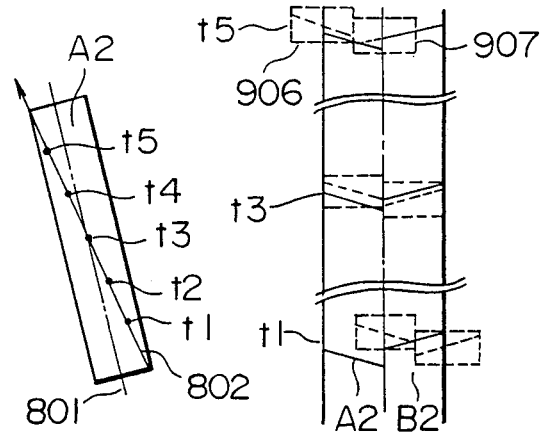
FIGS. 9, a-d, shows variations in the output level of reproduced signals obtained by the scanning with the pair head indicated in FIG. 8 and the time difference between the reproduced signals with respect to time.
Figure 9C:
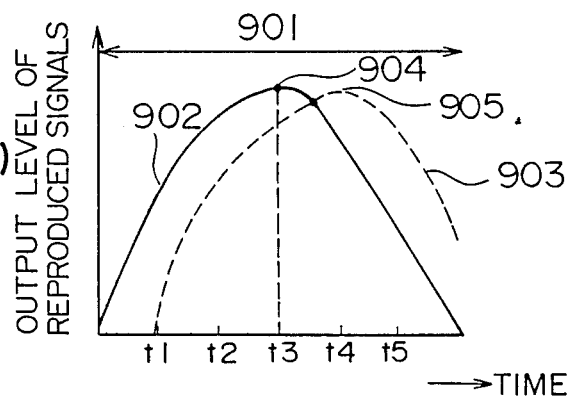
Figure 9D:
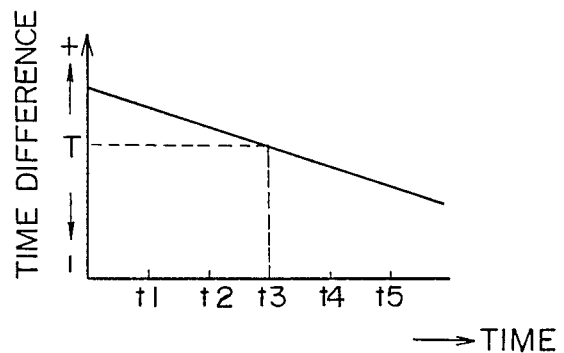

FIG. 9 shows variations in the output level of the reproduced signals and the time difference therebetween with respect to time during a scanning period 901 from one end to the other in the longitudinal direction of a recorded track (FIGS. 9(c) and (d)). 902 indicates variations in the output at the scanning 802 with the head. In the FIG. 9(b) shows the positional relation between the magnetization tracks A2 and B2 and the play back heads 906 and 907 at points of time t1, t3, t5 in the scanning 802 with head. The point of time t3, where the maximum value 904 of the reproduced signal is obtained, is the moment, where the head scans the position indicated by 804. At this time the play back heads 906 and 907 are on-track on the recorded tracks A2 and B2, respectively. The time difference between the reproduced signals is indicated in FIG. 9(d) and this reproduction time difference T at the point of time t3 may be the reference value for the following tracking control. Further 903 shows variations in the reproduction output at the scanning 803 with the head. The moment where the maximum value 905 of the reproduced signal is obtained, is the point of time where the head scans the position indicated by 805. That is, it corresponds to the point of time, where the center of the head gap in each of the heads is on-track on the magnetization trajectory A2. Consequently, examining the time difference between the reproduced signals at the point of time, where the output level thereof is maximum, this time difference may be the reference value, when the head is on-track. The formation of this reference value is effected by displacing an electro-mechanical converting element so that the magnetic head mounted on the electro-mechanical converting element constituted by a piezo-electric element, etc. traverses the recorded track in the direction of the width, when the tape is stopped, i.e. when the mode passes from the stop mode to the normal reproduction, and by realizing the head scanning trajectory, as indicated by 802.

Now a first embodiment of this invention will be explained.

Figure 10:
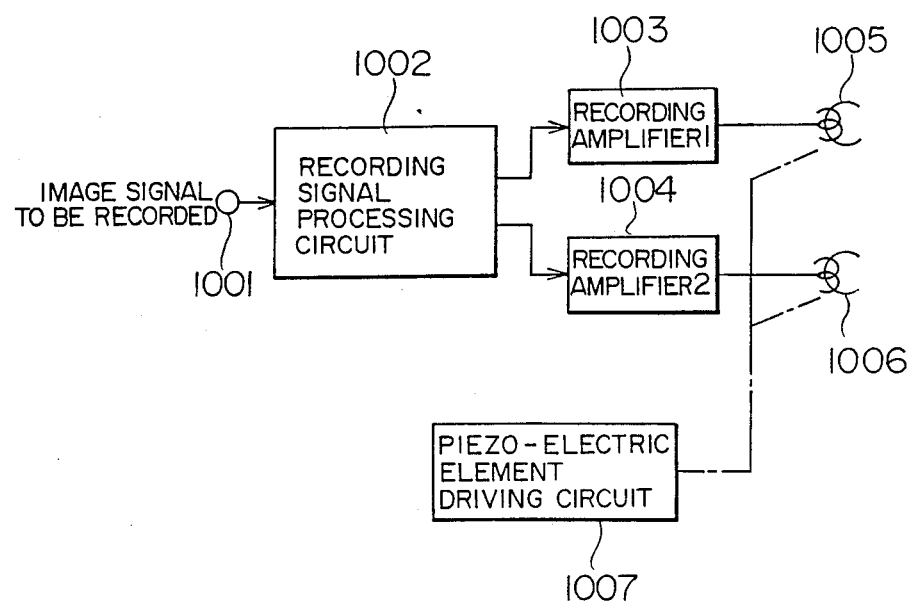
FIG. 10 is a block diagram showing the construction of a recording circuit.

FIG. 10 is a scheme showing the flow of the signal processing at the recording. In the figure the image signal to be recorded is inputted in a terminal 1001. A circuit 1002 is a recording signal processing circuit, which effects processings such as conversion of the frequency band of the original signal into a frequency band, which can be recorded, etc. 1003 and 1004 designate recording amplifiers, which supply recording signals to the head A 1005 and the head B 1006, respectively. 1007 represents a circuit driving the piezo-electric element (not shown in the figure), on which the heads A and B 1005 and 1006 are mounted. At the recording, in order to keep the displacement of the head to a constant value, it supplies a constant voltage to the piezo-electric element.

Figure 11:
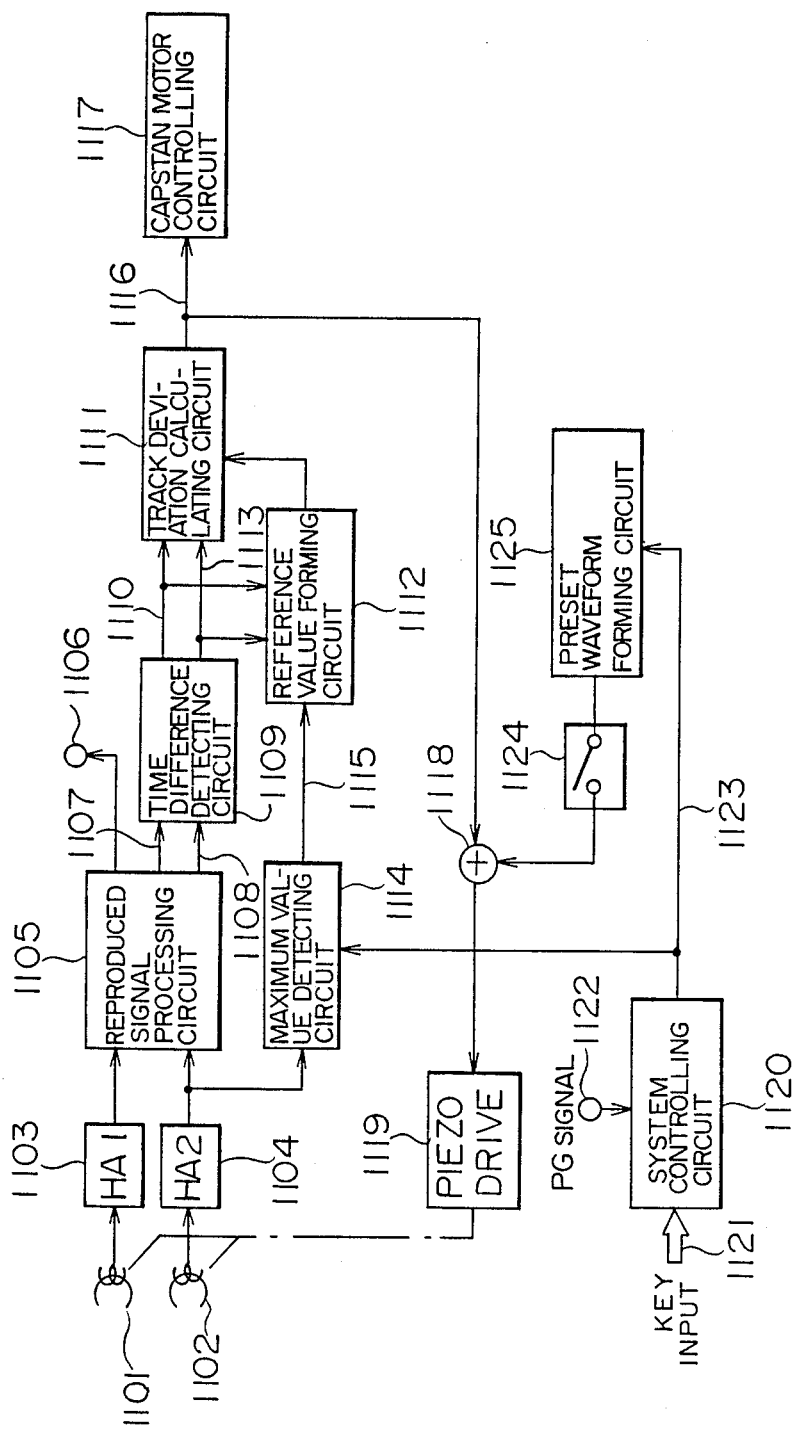
FIG. 11 is a block diagram illustrating a first embodiment of this invention.

FIG. 11 is a block diagram illustrating the first embodient of this invention. A time difference detecting circuit 1109, a reference value forming circuit 1112 and a maximum value detecting circuit 1114 indicated in the figure will be explained later in detail. In FIG. 11, 1101 and 1102 designate the heads A and B, respectively, for reproduction. 1103 and 1104 represent reproduction amplifiers. 1105 is a reproduction signal processing circuit, which converts signals reproduced by each of the heads into the same form as the original signal so as to be reproduction image signals, which are outputted through a terminal 1106. Further the reproduction signal processing circuit 1105 outputs specified signals reproduced by the heads, i.e. horizontal synchronization signals 1107 and 1108. The time difference detecting circuit 1109 is a circuit for detecting the reproduction time difference between these horizontal synchronization signals. A signal 1110 corresponding to this time difference is supplied to the track deviation calculating circuit 1111 and the reference value forming circuit 1112. The time difference detecting circuit 1109 outputs the time difference signal and at the same time decides which one of the horizontal synchronization signals reproduced by the heads A and B is earlier reproduced and outputs a polarity judgement signal 1113. A circuit 1114 is the maximum value detecting circuit, which outputs a signal 1115, whose polarity changes, when the signal reproduced by the head 1102 is at the maximum value. The reference value forming circuit 1112 forms a reference value by using the time difference signal 1110 at the point of time where the polarity of the signal 1115 changes. The track deviation calculating circuit 1111 calculates a difference signal between the time difference signal 1110 supplied by the circuit 1109 and the reference value supplied by the circuit 1112 and outputs a tracking error signal 1116. The tracking error signal 1116 is supplied to a capstan motor controlling circuit 1117 and at the same time to a piezo-electric element driving circuit 1119 through an adder 1118. The capstan motor controlling circuit 1117 controls the forwarding phase of the tape by using the tracking error signal 1116. The piezo-electric element driving circuit 1119 displaces the heads 1101 and 1102 by using the tracking error signal 1116 and effects the control so as to follow bending of the track. A circuit 1120 is a system controlling circuit, which output various kinds of mode instructing signals, depending on a key input signal 1121. Not only the key input signal but also a PG signal indicating the rotational phase of the rotating head through a terminal 1122 are supplied. A gate signal 1123 outputted by the circuit 1120 is a signal, which is at the "High" level only during a scanning period, where one head play-back-scans one recorded track, at the reproduction mode. Only during the period, where the gate signal 1123 is at the "High" level, the maximum value detecting circuit 1114 works and at the same time a switch 1124 is closed. A circuit 1125 is a preset waveform forming circuit. This circuit 1125 is a circuit for forming a saw tooth signal for driving the piezo-electric element so that the playback head traverses the recorded track, as it has been already explained, referring to FIGS. 8 and 9.

Figure 14:
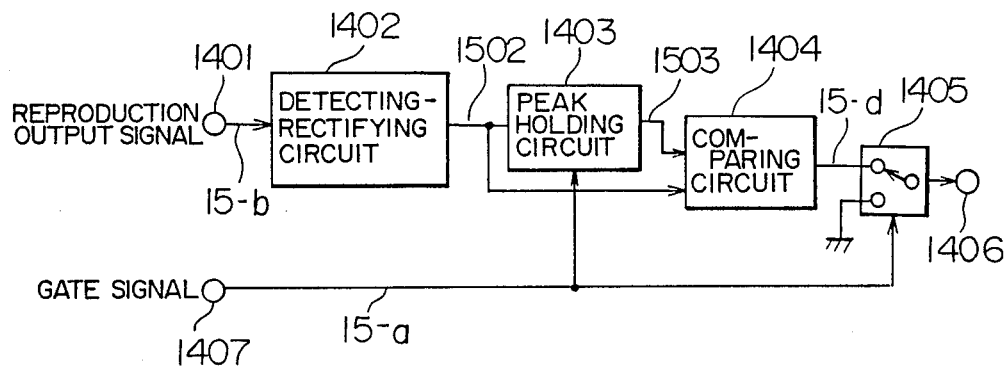
FIG. 14 is a block diagram illustrating in detail a maximum value detecting circuit in the first embodiment of this invention.
Figure 15:
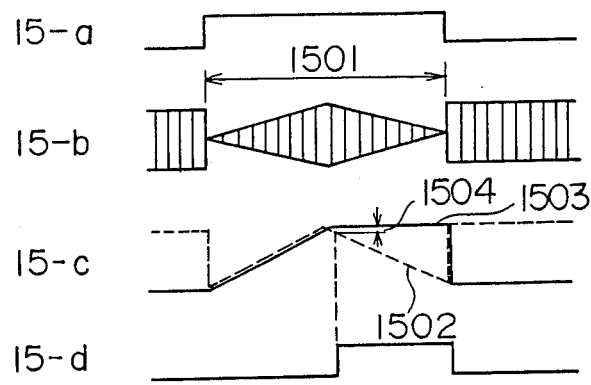
FIGS. 15, a-d, indicates signal waveforms at various parts in the circuit indicated in FIG. 14.

FIG. 14 is a block diagram illustrating in detail the maximum value detecting circuit 1114 indicated in FIG. 11 and FIG. 15 shows waveforms at various parts in the circuit indicated in FIG. 14. In the two figures the same reference numerals represents identical elements.

In FIG. 14 a reproduction signal (15-b) is inputted through a terminal 1401. The head scans the recorded magnetization trajectory in the direction of the width during the period indicated by 1501 and the reproduction signal (15-b) indicated in FIG. 15 indicates a reproduction signal obtained, when the head is on-track and play-back-scans the recorded track during the other period. Such a scanning with the head is effected by making the head movable by means of the electric-mechanical converting element such as a piezo-electric element, etc. only during the period indicated by 1501 at the normal reproduction mode. The reproduced signal (15-b) is detected-rectified by a detecting-rectifying circuit 1402 and transformed into a signal indicated by a broken line 1502 in (15-c). A circuit 1403 is a peak holding circuit, which holds the maximum value of the signal 1502 and outputs a signal indicated by 1503. A gate signal (15-a) is inputted through a terminal 1407. This gate signal is an output signal 1123 of the system controlling circuit 1120 indicated in FIG. 11, which is at the "high" level only during the period, where the head scans one track, at an arbitrary point of time at the reproduction mode. The peak holding circuit 1403 works during the period, where the gate signal is at the "high" level, and the output signal is at the "Low" level during the period, where the gate signal is at the "Low" level. A circuit 1404 is a level comparing circuit, which compares the level of the output signal 1502 of the detecting-rectifying circuit with the level of the output signal 1503 of the peak holding circuit. The comparing circuit outputs a signal, which is at the "High" level, when the level of the output signal of the peak holding circuit is higher than that of the detecting-rectifying circuit (as indicated in FIG. 15-*d*). The switching circuit 1405 takes out a signal (15-*d*), when the gate signal (15-*a*) is at the "High" level, and it is connected to the ground side during the "Low" level period. A timing signal (15-*d*) forming the reference value, which will be described later, is taken out through a terminal 1406.

Figure 12:
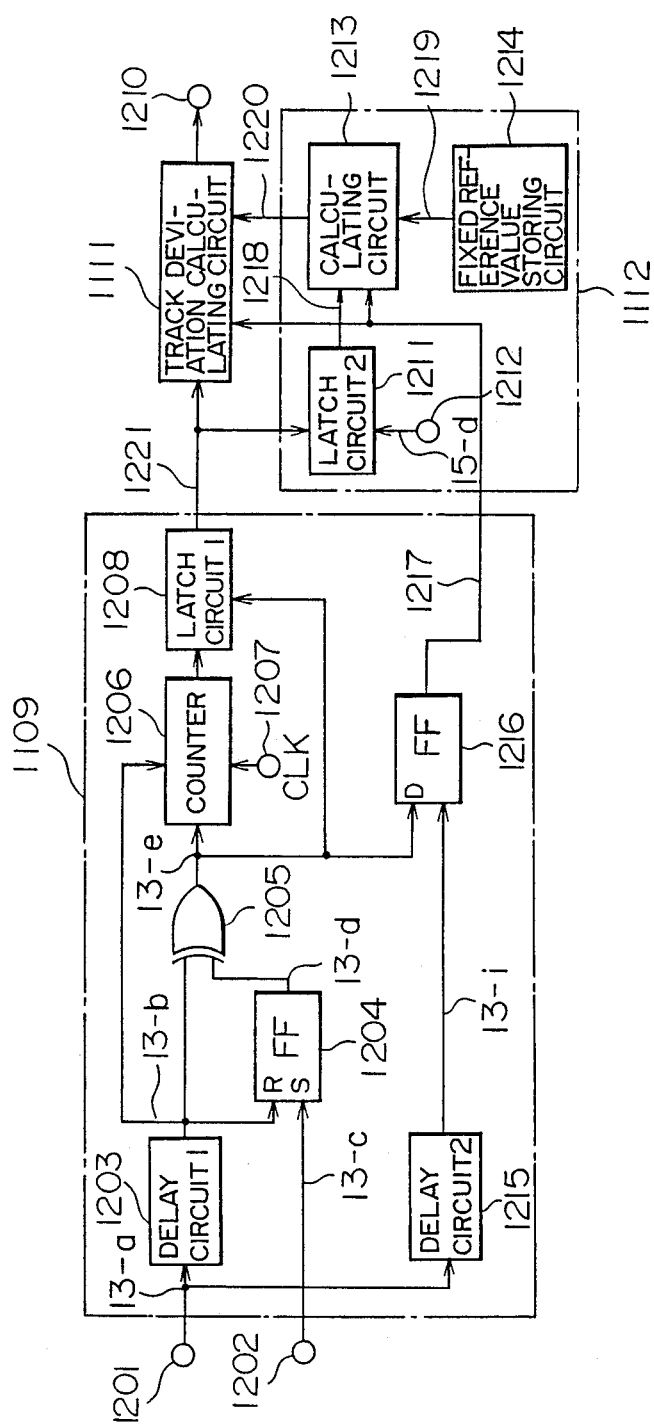
FIG. 12 is a block diagram illustrating in detail a time difference detecting circuit and a reference value forming circuit in the first embodiment of this invention.
Figure 13:
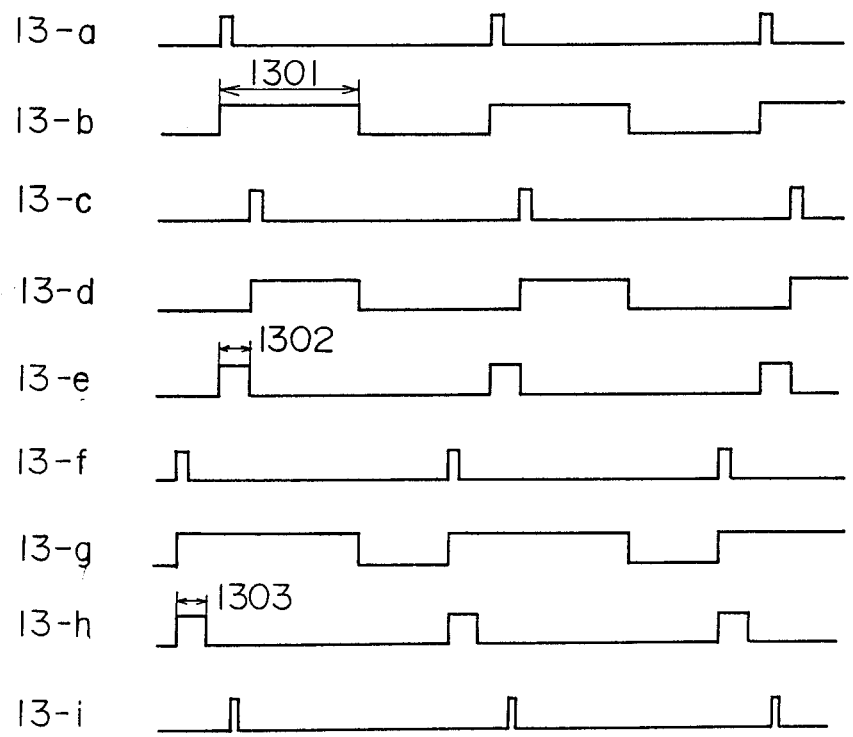
FIGS. 13, a-i, indicates signal waveforms at various parts in the device indicated in FIG. 12.

FIG. 12 is a block diagram indicating in detail the time difference detecting circuit 1109 and the reference value forming circuit 1112 indicated in FIG. 11 as well as the tracking deviation calculating circuit 1111. FIG. 13 shows signals at various parts in the circuit indicated in FIG. 12. Same reference numerals in FIGS. 11, 12 and 13 represent same items.

In FIG. 12, a horizontal synchronization signal (13-*a*) contained in the signal reproduced by the head A is inputted through a terminal 1201 and another horizontal synchronization signal (13-*c*) contained in the signal reproduced by the head B is inputted through another terminal 1202. A circuit 1203 is a delay circuit, which is triggered by the rising edge of the signal (13-*a*) and outputs a pulse signal (13-*b*), which is at the "High" level only during the period 1301 indicated in FIG. 13. A circuit 1204 is a reset-set flipflop (R.S-FF) circuit, which is set by the rising edge of the signal (13-*c*) and reset by the decaying edge of the signal (13-*b*). The output signal (13-*a*) output signal (13-*d*) of the R.S-FF circuit 1204 and the output signal (13-*b*) of the delay circuit 1203 are inputted in an exclusive logic sum (EX-OR) circuit 1205 so as to obtain a signal (13-*e*). Since the period 1302, where the signal (13-*e*) is at the "High" level, represents the time between the horizontal synchronization signal (13-*a*) and (13-*b*), if the mounting state of the heads A and B is correct, this time indicates the track deviation. A circuit 1206 is a counter circuit, in which the counting is started by the rising edge of the signal (13-*e*) and the counting value is reset by the decaying edge of the signal (13-*b*). The clock for counting is inputted through a terminal 1207. A circuit 1208 is a latch circuit, which latches the counting value of the counter circuit 1206 by the decaying edge of the signal (13-*e*). Consequently a value corresponding to the time difference between the horizontal synchronization signals is latched in the latch circuit 1208.

A signal (13-*f*) indicated in FIG. 13 illustrates a state, where the signal (13-*c*) is advanced in time with respect to the signal (13-*a*). At this time the output (13-*d*) of the R.S-FF circuit 1204 has a waveform indicated by (13-*g*). Further the output of the EX-OR circuit 1205 at this time has a waveform indicated by (13-*h*). Also at this time a value corresponding to the time indicated by 1303 is stored in the latch circuit 1208.

The signal (13-*a*) is retarded by the delay circuit 1215 so as to obtain an output signal indicated by (13-*i*). A circuit 1216 is a D-flipflop (D-FF) circuit, which latches the input level of the signal (13-*e*) by the rising edge of the signal (13-*i*). For this reason, if the horizontal synchronization signal reproduced by the head B is retarded with respect to the horizontal synchronization signal (13-*a*) reproduced by the head A, as indicated by (13-*c*), the output signal of the D-FF circuit 1216 is at the "High" level. On the contrary, if the former is advanced with respect to the latter, as indicated by (13-*f*), the output signal of the circuit 1216 is at the "Low" level. Consequently the output signal 1217 of the circuit 1216 is a signal indicating whether the horizontal synchronization signal reproduced by the head B is retarded or advanced with respect to that reproduced by the head A, i.e. signal indicating the polarity of the tracking error signal (whether the head is deviated from the on-track position towards right or left).

The output signal of the latch circuit 1208 indicated in FIG. 12 is inputted in another latch circuit 1211. A pulse signal (15-*d*) rising at a point of time near the maximum value of the reproduced output signal, which has been already explained, referring to FIG. 15, is inputted through a terminal 1212. The latch circuit 1211 latches the content of the latch circuit 1208 with a timing of the rising edge of the signal (15-*d*). That is, the time difference between the horizontal synchronization signals, when the head is on-track, is stored in the latch circuit 1211. A circuit 1214 is a fixed reference value storing circuit, in which the reference value in the case where the mounting state of the heads A and B is correct and the heads are on-track is stored. However, the fixed reference value may be also zero as the reference value, when the heads are on-track. A circuit 1213 is a calculating circuit, which calculates the sum of a value 1218 corresponding to the time difference between the horizontal synchronization signals reproduced by the heads, which are on-track, and the fixed reference value 1219, or the difference therebetween, taking the polarity of the signal 1217 into account. Consequently the output signal 1220 of the calculating circuit 1213 is the reference value, in which the mounting state of the heads A and B is taken into account. The output signal of the output signal 1221 of the latch circuit 1208, which indicates the reproduced time difference between the horizontal synchronization signal at an arbitrary point of time and the reference value 1220 are added or the difference therebetween is formed in the track deviation calculating circuit 1209, taking the polarity of the signal 1217 into account. Consequently a tracking error signal taking the mounting state of the heads into account is taken out through the terminal 1210.

As is clearly seen from the above explanation, according to this invention, since the on-track state can be determined by detecting the maximum value of the reproduced output signal and the reference value is calculated by using the reproduced time difference between specified signals reproduced at that time for calculating the tracking error signal, an effect can be obtained that it is possible to prevent tracking deviations due to error in the mounting of the pair head.

Before explaining a second embodiment of this invention, the fundamental conception of the second embodiment of this invention will be explained.

In the second embodiment of this invention the tracking error signal is formed by using the difference between the reproduced time difference between signals reproduced by two heads having different azimuthal angles and the value representing the reference time difference and this value representing the reference time difference is rewritten, when the on-track state is detected by another method.

Now this other method, by which the on-track state is detected, will be explained first.

Figure 16:
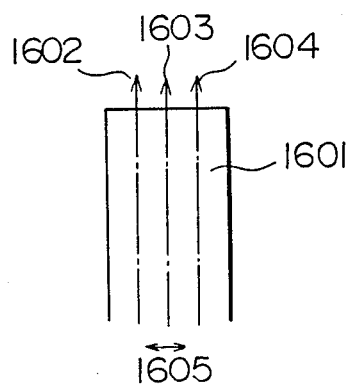
FIG. 16 shows the relation between the recorded magnetization trajectory and the head scanning trajectory.

FIG. 16 shows the relative positional relation between a recorded track and play back head scanning trajectories, in which 1601 indicates the recorded track nd 1602 to 1604 represent the head scanning trajectories. the figure shows that 1603 is in the on-track state and that 1602 and 1604 are in states where the heads are deviated from the on-track towards left and right, respectively, on the sheet plane of the figure. Hereinbelow, unless otherwise specified, right and left means right and left on the sheet plane of the figure. Consider now variations in the level of the reproduced signal, when the head is forcedly displaced towards right and left, as indicated by an arrow 1605.

Figure 17:
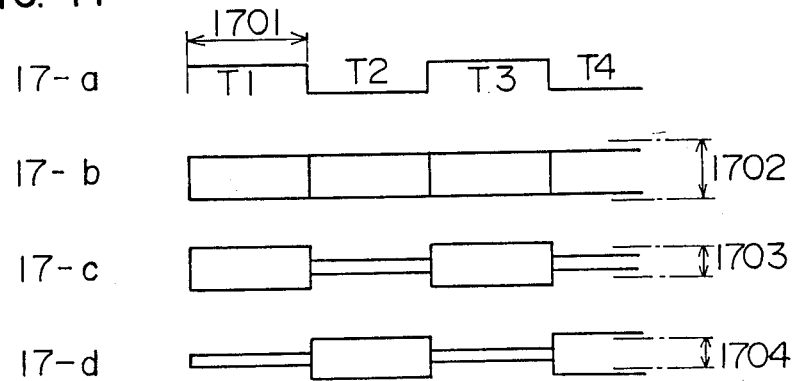
FIGS. 17, a-d, shows a reproduced signal obtained when the head is forcedly displaced.

FIG. 17 shows these variations in the level of the reproduced signal in this case. In the figure (17-a) is a head switching signal (H. SW signal) showing the rotational position of the recording and play back head and the time necessary for scanning one recorded track corresponds to the time indicated by 1701. Further, it is supposed that, when the H. SW signal is at the "High" level, i.e. during the periods indicated by T1, T3, . . . , the head is deviated forcedly towards right and on the contrary during the periods indicated by T2, T4, . . . , the head is deviated towards left. A signal indicated by (17-b) shows a reproduced signal obtained by deviating the head from the scanning trajectory indicated by 1603 towards left and right. 1702 indicates the level of the reproduced signal obtained without deviating the head and when the head is deviated, the level of the reproduced signal is lowered, whichever the direction of the deviation is, left and right. A signal indicated by (17-c) is a signal obtained when the head is deviated from the head scanning trajectory indicated by 1602. In this case the level of the reproduced signal is higher at the "High" level of H-SW signal and lower at the "Low" level of H-SW signal than the level 1703 obtained without deviating the head. (17-d) shows a similar signal, when the scanning trajectory is one indicated by 1604. In this case the increase and the decrease of the level are opposite to those indicated by (17-c). Consequently it is possible to known whether the present head scanning is in the on-track state or not by detecting the difference between the levels of the reproduced signals obtained in each of the periods of the H. SW signal, when the head is deviated forcedly. For this reason it is possible to annul the fluctuations in the mounting position of the pair head by adopting the reference time difference as the time difference between the reproduced signals obtained by the pair head, when the head scanning is on-track.

Next, a second embodiment of this invention will be explained.

Figure 18:
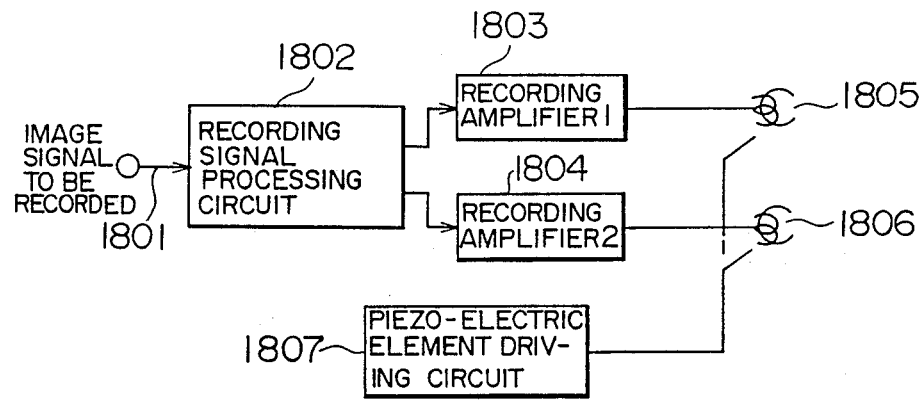
FIG. 18 is a block diagram showing the construction of a recording circuit.

FIG. 18 shows the signal processing at the recording. In the figure the image signal to be recorded is inputted through a terminal 1801. A circuit 1802 is a recording signal processing circuit, which effects processing such s conversion of the frequency band of the original signal into another, which can be recorded, etc. 1803 and 1804 designate recording amplifiers, which supply recording signals to the head A 1805 and the head B 1806, respectively. 1807 represents a circuit driving a piezo-electric element (not shown in the figure), on which the heads 1805 and 1806 are mounted. A constant voltage is supplied to the piezo-electric element in order to fix the displacement of the heads at the recording.

Figure 19:
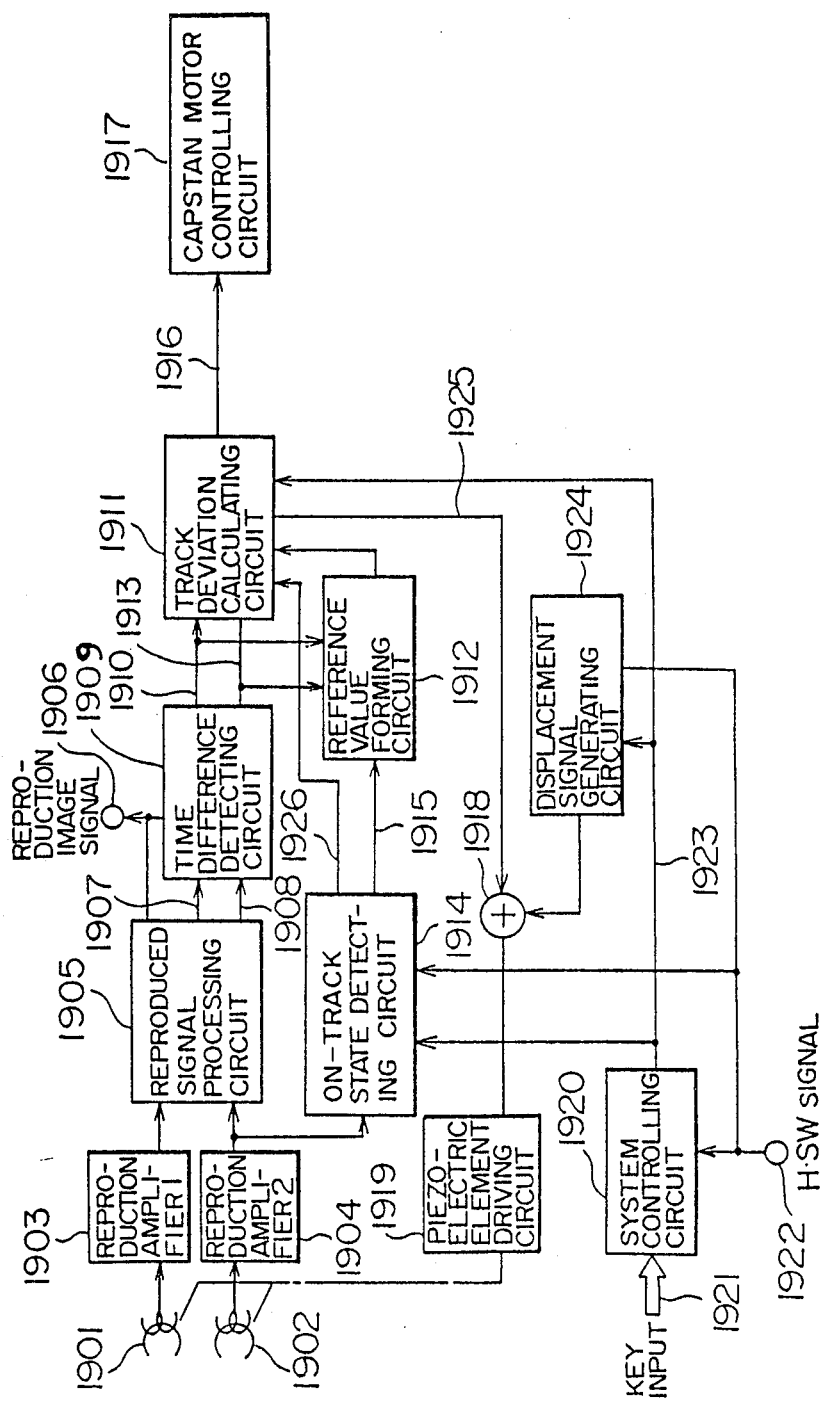
FIG. 19 is a block diagram illustrating a second embodiment of this invention.

FIG. 19 is a block diagram illustrating the second embodiment of this invention. A time difference detecting circuit 1909, a reference value forming circuit 1912 and an on-track state detecting circuit 1914 indicated in the figure will be explained later in detail.

In FIG. 19, 1901 and 1902 designate the heads A and B, respectively, for reproduction. 1903 and 1904 represent reproduction amplifiers. 1905 is a reproduced signal processing circuit, which converts signals reproduced by each of the heads into the same form as the original signal so as to be reproduction image signals, which are outputted through a terminal 1906. Further the reproduction signal processing circuit 1905 outputs specified signals reproduced by the heads, i.e. horizontal synchronization signals 1907 and 1908. A circuit 1909 is a circuit for detecting the reproduction time difference between these horizontal synchronization signals. A signal 1910 corresponding to this time difference is supplied to the track deviation calculating circuit 1911 and the reference value forming circuit 1912. The circuit 1909 outputs the time difference signal and at the same time outputs a polarity judgement signal 1913, which decides which one of the horizontal synchronization signals reproduced by the heads A and B is earlier reproduced. A circuit 1914 is the on-track state detecting circuit, which detects the on-track state on the basis of the reproduced signals, when the heads are forcedly displaced. The circuit 1914 outputs a pulse signal 1915, when the heads are not in the on-track state, and nothing, when they are in the on-track state (e.g. "Low" level), as described later. Further the circuit 1914 outputs a direction judgement signal 1926, by which it is judged in which direction the tracking is deviated towards left or right. The reference value forming circuit 1912 forms the reference value by using the value of the time difference 1910, when the circuit 1914 generates a pulse signal. Since the last pulse signal generated by the circuit 1914 represents the state just before the heads enter the on-track state, the reference value may be the time difference signal at the moment where the last pulse signal has arrived, and the reference value may be formed also by evaluating the deviation from the on-track state. The track deviation calculating circuit 1911 calculates a difference signal between the time difference signal 1910 supplied by the circuit 1909 and the reference value supplied by the circuit 1912 and outputs a tracking error signal 1916 and 1925. For tracking error signal 1925, during the period where the heads are forcedly displaced in order to detect the on-track state, a constant value may be outputted. The tracking error signal 1916 is supplied to a capstan motor controlling circuit 1917. Further the tracking error signal 1925 is supplied to a piezo-electric element driving circuit 1919 through an adder 1918. The capstan motor controlling circuit 1917 controls the forwarding phase of the tape by using a relatively low frequency signal component of the tracking error signal 1916. The piezo-electric element driving circuit 1919 displaces the heads 1901 and 1902 by using a relatively high frequency signal component of the tracking error signal 1925 and effects the control so as to follow bending of the track.

A circuit 1920 is a system controlling circuit, which outputs various kinds of mode instructing signals, depending on a key input signal 1921. Not only the key input signal but also a H. SW signal are supplied to the circuit 1920 through a terminal 1922. The H. SW signal is supplied also to a displacement signal generating circuit 1924 and the on-track state detecting circuit 1914. A circuit 1920 outputs an instruction signal 1923 for driving a displacement signal generating circuit 1924 and an on-track state detecting circuit 1914. The system controlling circuit 1920 outputs an instruction signal 1923 for driving these circuits during a certain period, e.g. when the stop mode passes to the reproduction mode.

The output of the instruction signal 1923 is not outputted to the moment, where the mode is switched over, but it is preferably outputted for every predetermined period of time e.g. in the reproduction state. It is because the recording position of the horizontal synchronization signal can be different in the course of the reproduction by the fact that the mounting position of the head in the deck fluctuates, when a tape which is recorded by a deck A and on which a new signal is edited and recorded by another deck B, is reproduced by still another deck C. When such a tape is reproduced, it is desirable to check periodically the tracking in order to improve the reliability of tracking characteristics.

As still another method, a method may be adopted, by which it is detected that the positions of the horizontal synchronization signals of the signals recorded in the course of the reproduction are different and at this time the instruction signal 1923 is outputted. This method wil be explained later. The displacement signal generating circuit 1924 is a circuit for generating a signal for displacing forcedly the heads in order to detect the on-track state, as it has been already explained, referring to FIGS. 16 and 17.

Figure 22:
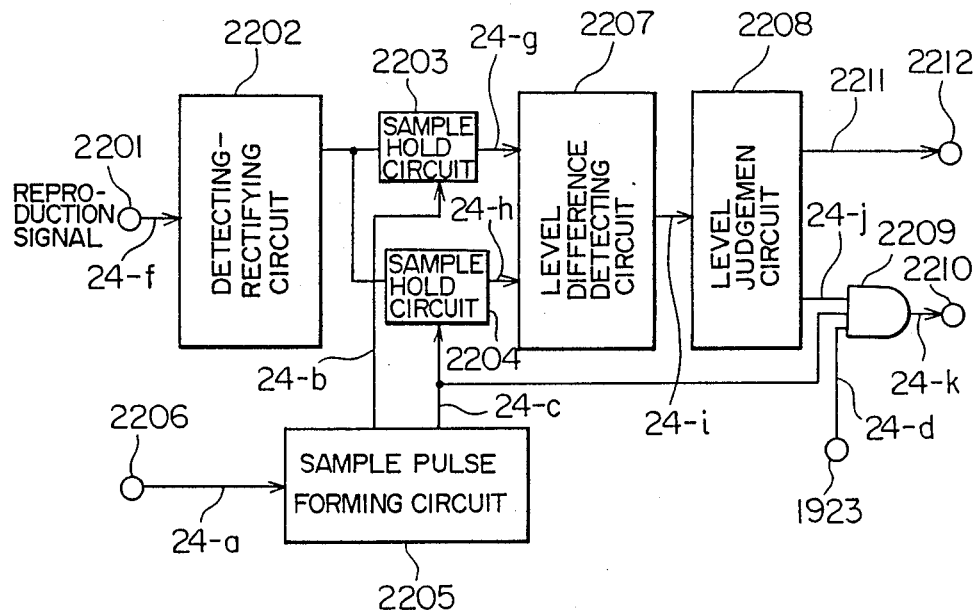
FIG. 22 is a block diagram illustrating in detail an on-track state detecting circuit in the second embodiment of this invention.
Figure 23:
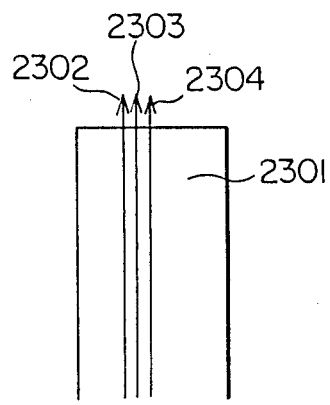
FIG. 23 shows a scanning trajectory obtained by using the head.
Figure 24:
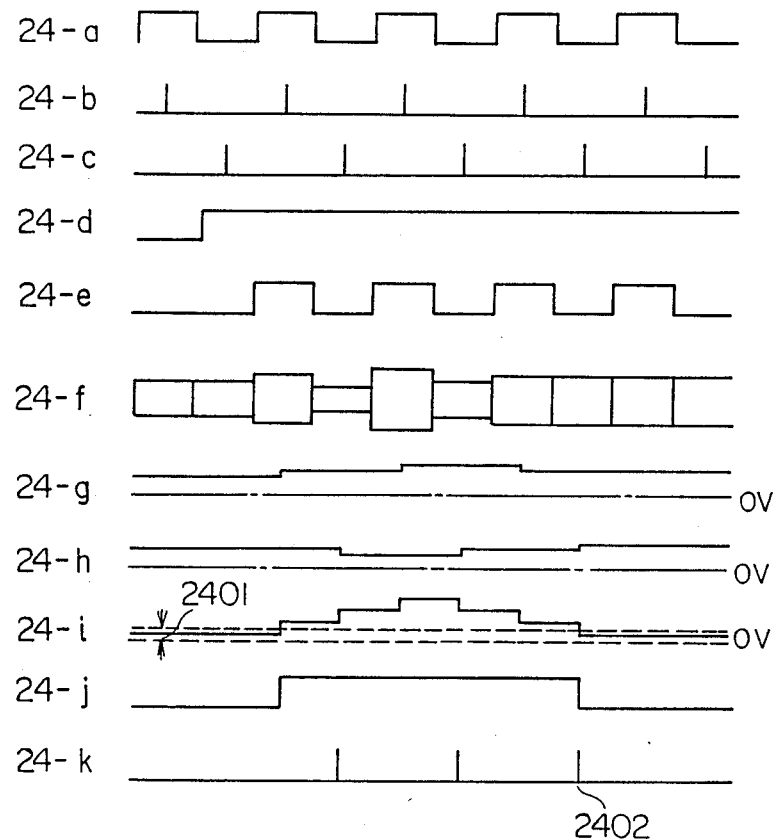
FIGS. 24, a-k, indicates signal waveforms at various parts in the circuit indicated in FIG. 22.

FIG. 22 is a block diagram illustrating in detail the on-track state detecting circuit 1914 indicated in FIG. 19 and FIG. 23 shows a head scanning trajectory. FIG. 24 shows waveforms in various parts of the circuit indicated in FIG. 22 and in these figures the same reference numerals represent identical elements.

The waveforms in various parts indicated in FIG. 24 indicate the variations in waveform from the head scanning trajectory 2302 indicated in FIG. 23 through 2303 to the head scanning trajectory 2304 in the on-track state. In FIG. 23 reference numeral 2301 indicates a recorded track.

In FIG. 22 a reproduction signal (24-*f*) is inputted through a terminal 2201. A circuit 2202 is a detecting-rectifying circuit and 2203 and 2204 are sample hold circuits. A circuit 2205 is a sample pulse forming circuit, which outputs sample pulses (24-*b*) and (24-*c*) at positions retarded by a predetermined amount from edges of the H. SW signal inputted through a terminal 2206. The outputs (24-*g*) and (24-*h*) of the sample hold circuits correspond to levels of the reproduced signal (24-*f*), as indicated in FIG. 24. A circuit 2207 is a level difference detecting circuit, which outputs a level difference (24-*i*) between the signals (24-*g*) and (24-*h*). A circuit 2208 is a level judgement circuit. The circuit 2208 judges whether the level of the input signal is within a certain level region indicated by 2401 in FIG. 24 or without it. The output signal (24-*j*) is at the "Low" level, when the input signal to the circuit 2208 is within the certain level region, and it is at the "High" level, independently of the polarity of the level difference, when it is without the certain level region. A circuit 2209 is an AND circuit, which outputs a "High" level signal at a terminal 2210, when all the signals (24-*j*), (24-*c*) and (24-*d*), which starts the detection of the on-track state, (signal 1923 indicated in FIG. 19) are at the "High" level. Consequently a signal (24-*k*) is a pulse signal, as indicated in FIG. 24. The output timing of the pulse signal 2402, which is outputted at the last of the signal (24-*k*), is the timing of the moment, where the heads enter the on-track state, as can be understood while comparing it with the signal (24-*f*). This signal (24-*k*) is supplied to the reference value forming circuit 1912 indicated in FIG. 19 and used as a timing signal for latching the time difference between the signals reproduced by the pair head. On the other hand the level judging circuit 2208 outputs a level judging signal 2211, to which the polarity is added. This signal 2211 is a signal, which is at the "High" level, when the level of the input signal (24-*i*) is higher than a predetermined value, and at the "Low" level, when the former is lower than the latter. Therefore it is possible to judge the direction of the track deviation on the basis of the polarity of the signal 2211. The signal 2211 is supplied to the track deviation calculating circuit 1911 indicated in FIG. 19.

Figure 21:
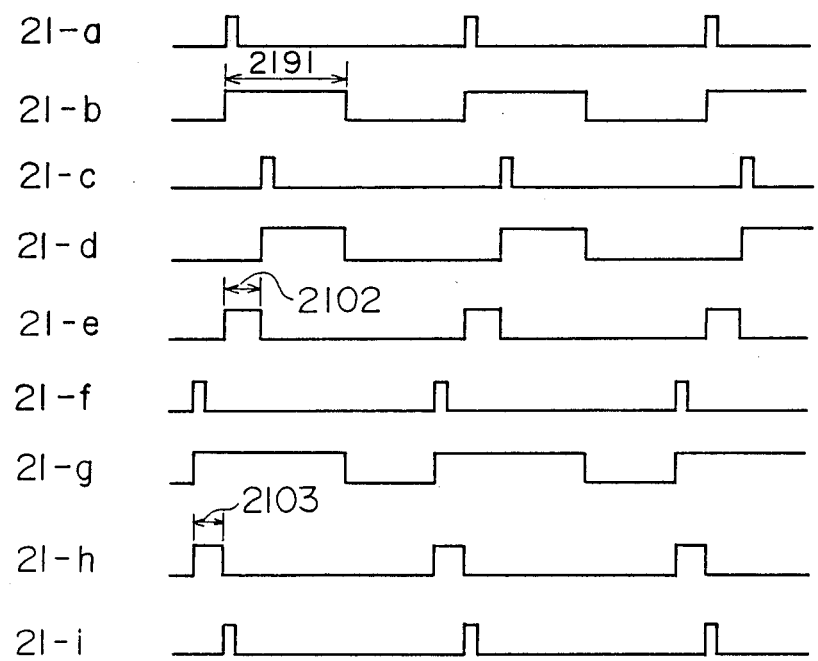
FIGS. 21, a-i, indicates signal waveforms at various parts in the device indicated in FIG. 20.
Figure 20:
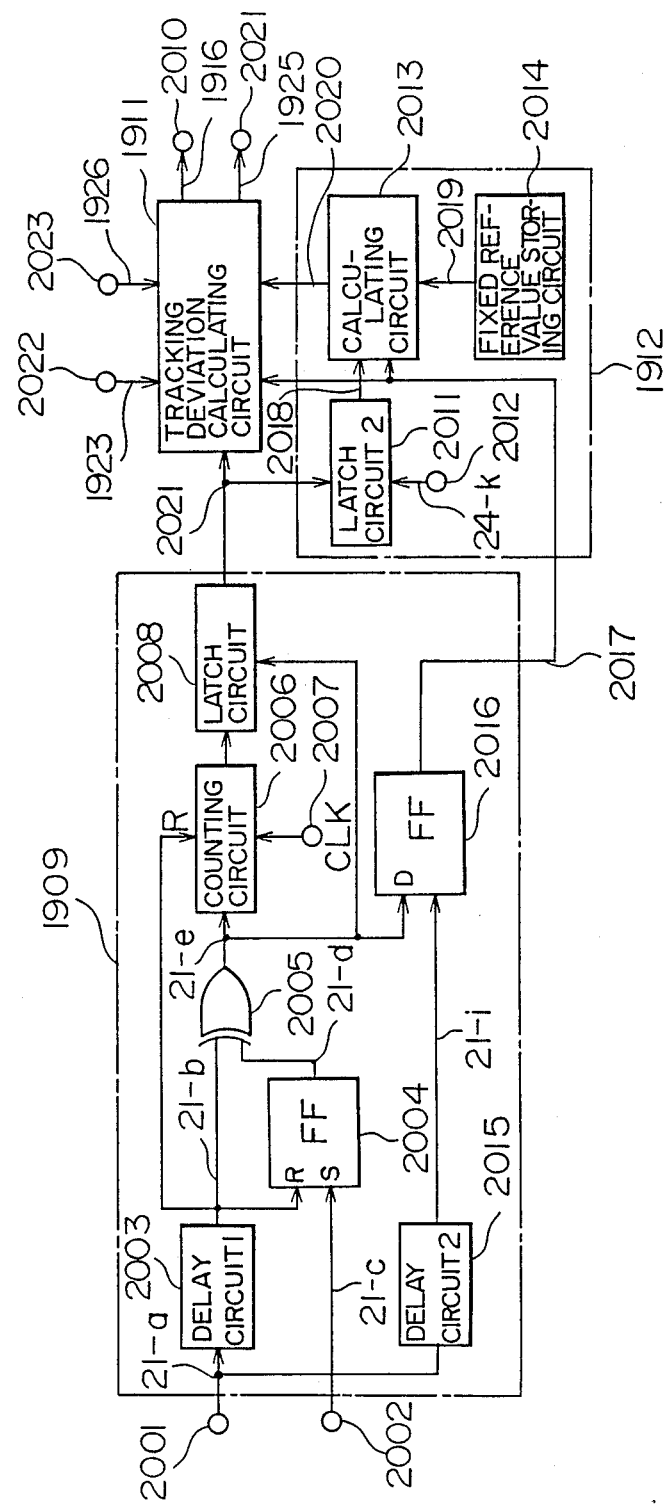
FIG. 20 is a block diagram illustrating in detail a time difference detecting circuit and a reference value forming circuit in the second embodiment of this invention.

FIG. 20 is a block diagram indicating in detail the time difference detecting circuit 1909 and the reference value forming circuit 1912 indicated in FIG. 19 as well as the tracking deviation calculating 1911. FIG. 21 shows signals at various parts in the circuit indicated in FIG. 20. The same reference numerals in FIGS. 19, 20 and 21 represent identical elements.

In FIG. 20, a horizontal synchronization signal (21-*a*) contained in the signal reproduced by the head A is inputted through a terminal 2001 and another horizontal synchronization signal (21-*c*) contained in the signal reproduced by the head B is inputted through another terminal 2002. A circuit 2003 is a delay circuit, which is triggered by the rising edge of the signal (21-*a*) and outputs a pulse signal (21-*b*), which is at the "High" level only during the period 2101 indicated in FIG. 21. A circuit 2004 is a reset-set flip-flop (R.S-FF) circuit, which is set by the rising edge of the signal (21-*c*) and reset by the decaying edge of the signal (21-*b*). The output signal (21-*d*) of the R.S-FF circuit 2004 and the output signal (21-*b*) of the delay circuit 2003 are inputted in an exclusive logic sum (EX-OR) circuit 2005 so as to obtain a signal (21-*e*). Since the period 2102, where the signal (21-*e*) is at the "High" level, represents the time between the horizontal synchronization signals, if the mounting state of the heads A and B is correct, this time indicates the track deviation. A circuit 2006 is a counter circuit, in which the counting is started by the rising edge of the signal (21-*e*) and the counting value is reset by the decaying edge of the signal (21-*b*). The clock for counting is inputted through a terminal 2007. A circuit 2008 is a latch circuit, which latches the counting value of the counter circuit 2006 by the decaying edge of the signal (21-*e*). Consequently a value corresponding to the time difference between the horizontal synchronization signals is latched in the latch circuit 2008.

A signal (21-*f*) indicated in FIG. 21 illustrate a state, where the signal (21-*c*) is advanced in time with respect to the signal (21-*a*). At this time the output (21-*d*) of the R.S-FF circuit 2004 has a waveform indicated by (21-*g*). Further the output of the EX-OR circuit 2005 at this time has a waveform indicated by (21-*h*). Also at this time a value corresponding to the time indicated by 2103 is stored in the latch circuit 2008.

The signal (21-*a*) is retarded by the delay circuit 2015 so as to obtain an output signal indicated by (21-*i*). A circuit 2016 is a D-flipflop (D-FF) circuit, which latches the input level of the signal (21-*e*) by the rising edge of the signal (21-*i*). For this reason, if the horizontal synchronization signal reproduced by the head B is retarded with respect to the horizontal synchronization signal (21-*a*) reproduced by the head A, as indicated by (21-*c*), the output signal of the D-FF circuit 2016 is at the "High" level. On the contrary, if the former is advanced with respect to the latter, as indicated by (21-*f*), the output signal of the circuit 2016 is at the "Low" level. Consequently the output signal 2017 of the circuit 2016 is a signal indicating whether the horizontal synchronization signal reproduced by the head B is retarded or advanced with respect to that reproduced by the head A, i.e. signal indicating the polarity of the tracking error signal.

The output signal of the latch circuit 2008 is inputted in another latch circuit 2011. A pulse signal (24-*k*), which has been already explained, referring to FIG. 24, is inputted through a terminal 2102. The latch circuit 2011 latches the content of the latch circuit 2008 every time, when a pulse signal of the signal (24-*k*) is inputted. That is, the value, which is latched at last in the latch circuit 2011, is produced by the pulse signal indicated by 2402 in FIG. 24 and this value corresponds to the time difference between the horizontal synchronization signals, when the heads are on-track.

A circuit 2014 is fixed reference value storing circuit, in which the reference value in the case where the mounting state of the heads A and B is correct and the heads are on-track is stored. However the fixed reference value may be also zero as the reference value, when the heads are on-track. A circuit 2013 is a calculating circuit, which calculates the sum of a value 2018 corresponding to the time difference between the horizontal synchronization signals reproduced by the heads, which are on-track, and the fixed reference value 2019, or the difference therebetween, taking the polarity of the signal 2017 into account. Consequently the output signal 2020 of the calculating circuit 2013 is the reference value, in which the mounting state of the heads A and B is taken into account.

A circuit 1911 is a track deviation calculating circuit, which calculates the sum of a signal 2021 obtained by latching the value of the reproduction time difference of the horizontal synchronization signals at an arbitrary point of time and the reference value 2020 and the difference thereof, taking the polarity of the signal 2017 into account. The values of these sum and difference may be multiplied by a suitable factor, taking the loop gain of the control system into account, and further operated by means of a digital filter, etc. The circuit 1911 calculates the tracking error signal 1916, which is supplied to a circuit 1917 controlling a capstan motor, and the tracking error signal 1925 for driving the piezoelectric element. Further a signal 1923, which starts an operation of detecting the on-track state, and a direction judgement signal 1926 indicating the direction of the track deviation supplied by the on-track state detecting circuit are supplied to the circuit 1911. In the circuit 1911, during the period of the mode, by which the on-track state is detected by using these signals 1923 and 1926 (when the signal is at the "High" level), the signal 1925 is adopted as this fixed value. This is a means for removing influences of the track deviation produced by the forced deviation of the piezo-electric element. Further the tracking error signal 1916 during the period of this mode effects an operation of an addition of a predetermined fixed value to the real tracking error signal or a subtraction thereof from the last, taking the polarity of the direction judgement signal 1926 into account. By effecting this operation it is possible to bring the head scanning close to the on-track state by means of the controlling system for the capstan motor. For example it is possible to move the state of the head scanning 2302 indicated in FIG. 23 towards 2304.

Next, a third embodiment, in which a starting signal for detecting the on-track state is formed, will be explained.

Figure 25:
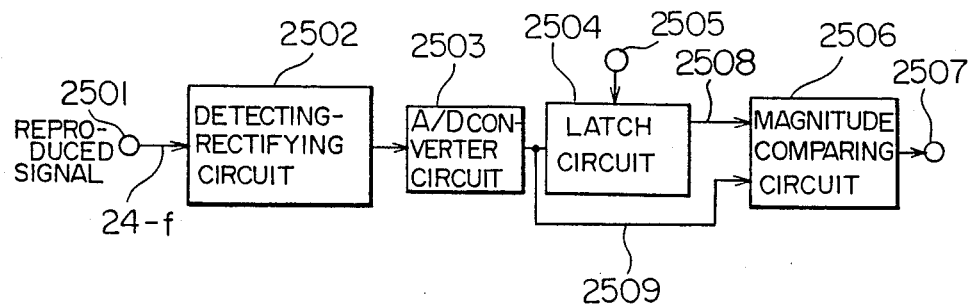
FIG. 25 is a block diagram of a circuit for forming a starting signal, which drives the on-track state detecting circuit, in a third embodiment of this invention.

FIG. 25 illustrates a concrete embodiment for forming the starting signal stated above. In the figure a reproduced signal (24-*f*) is inputted through a terminal 2501. A circuit 2502 is a detecting-rectifying circuit; 2503 is an A/D converter circuit; and 2504 is a latch circuit. A pulse signal generated when the on-track state is detected, e.g. the signal (24-*k*) indicated in FIG. 24 is inputted in the latch circuit 2504 through a terminal 2505. Consequently, as the last value latched by the latch circuit 2504, the value of the level of the reproduced signal, when the heads are on-track, is stored. The output value 2508 of the latch circuit and the value 2509 of the level of the reproduced signal at an arbitrary point of time are compared in a magnitude comparing circuit 2506 concerning the magnitude of the value of the level, which outputs a signal, which is at the "High" level, through a terminal 2507, when the level of 2509 is lower by a value greater than a predetermined value than the level of 2508. For this reason, when a magnetization trajectory having a different recording position of the horizontal synchronization signals is reproduced, i.e. when a magnetization trajectory recorded with a pair head at a mounting position which is different from that of the play back head, is reproduced, a signal, which is at the "High" level, is outputted through the terminal 2507, because, when such a magnetization trajectory is reproduced, the tracking control functions so that the time difference between the reproduced signals tends to be zero and as the result miss-tracking is produced so that the level of the reproduced signal is lowered. Therefore, when the signal obtained at the terminal 2507 is used instead of the starting signal 1923 for detecting the on-track state, which has been already explained, referring to FIG. 19, an advantage is obtained that the detection of the on-track state can be effected automatically only when it is required.

As explained above, according to this invention, since the on-track state is detected by detecting the maximum value of the reproduced output signal and the reference value for obtaining the tracking error signal is calculated by using the reproduction time difference between specified signals reproduced at that time, an effect is obtained that it is possible to prevent tracking deviations due to errors in the mounting of the pair head.

Furthermore, since the on-track state is detected by displacing forcedly with a predetermined period and the reference value for obtaining the tracking error signal is calculated by using the reproduction time difference between specified signals reproduced at that time, an effect is obtained that it is possible to prevent tracking deviations due to errors in the mounting of the pair head.

In addition, according to this invention, since it is possible to drive the circuit for detecting the on-track state, when the level of the reproduced signal at an arbitrary point of time is lower by a predetermined value than the level of the reproduced signal at the on-track state, it is possible to drive the on-track state detecting circuit with a high efficiency, even if a series of magnetic tapes recorded with decks having different mounting positions of the pair head are reproduced.

What is claimed is:

1. A tracking error signal forming circuit comprising:
   means for obtaining a reproduction time difference between specified signals, each of which is contained in the reproduced signal reproduced by each of at least two heads having different azimuthal angles and mounted on an electro-mechanical converting element;
   reference value forming means for forming a reference value for the tracking control;
   operating means for calculating the difference between the reproduction time difference and the reference value or the sum thereof;
   maximum value detecting means for detecting the maximum value of at least one of the reproduced signals; and
   displacement means for displacing forcedly said electro-mechanical converting element in the positive or negative direction;
   wherein said reproduction time difference at the point of time, at which the maximum value of the reproduced signal is detected by said maximum value detecting means, is used as the reference value for the tracking control in said reference value forming means.

2. A tracking error signal forming circuit according to claim 1, wherein said reference value forming means includes means for calculating the difference between said reproduction time difference at the point of time, at which the maximum value of the reproduced signal is detected by said maximum value detecting means, and a fixed reference value, or the sum thereof.

3. A tracking error signal forming circuit according to claim 1, wherein said reproduction time difference detecting means outputs the time difference signal and at the same time decides which one of the specified signals reproduced by each of the heads is earlier reproduced and outputs a polarity judgement signal.

4. A tracking error signal forming circuit according to claim 1, wherein when the mode passes from a tape stop mode to the normal reproduction, said electro-mechanical converting element is displaced by said displacement means for displacing forcedly said electro-mechanical converting element so that the play back magnetic head traverses a recorded track in the direction of the width thereof and said reference value forming means forms during that time the reference value for the tracking control.

5. A tracking error signal forming circuit according to claim 1, wherein when the mode passes from a tape stop mode to the normal reproduction, said electro-mechanical converting element is displaced by said displacement means for displacing forcedly said electro-mechanical converting element so that the play back magnetic head traverses a recorded track in the direction of the width thereof and that the highest level of the reproduced signal is obtained, when the central portion of the magnetic tape is reproduced, and said reference value forming means forms during that time the reference value for the tracking control.

6. A tracking error signal forming circuit according to claim 1, wherein said maximum value detecting means outputs a signal, whose polarity changes, when the level of the reproduced signal is highest.

7. A tracking error signal forming circuit according to claim 1, wherein said tracking error signal outputted by said operating means for calculating the difference between the reproduction time difference and the reference value or the sum thereof is inputted in said displacement means for displacing said electro-mechanical converting elements.

8. A tracking error signal forming circuit according to claim 1, wherein said tracking error signal outputted by said operating means for calculating the difference between the reproduction time difference and the reference value or the sum thereof is inputted in a capstan motor controlling circuit controlling the forwarding phase of the tape.

9. A tracking error signal forming circuit according to claim 1, wherein said displacement means for displacing forcedly said electro-mechanical converting element includes a circuit generating a signal having a saw tooth waveform for driving said electro-mechanical converting element so that the play back head traverses said recorded track.

10. A tracking error signal forming circuit comprising:
    at least two heads having different azimuthal angles and mounted on an electro-mechanical converting element;
    means for obtaining a reproduction time difference between specified signals, each of which is contained in the reproduced signal reproduced by each of said heads;
    reference value forming means for forming a reference value for the tracking control;
    operating means for calculating the difference between the reproduction time difference and the reference value or the sum thereof;
    displacement means for displacing forcedly said electro-mechanical converting element in the positive or negative direction; and
    level difference detecting means for detecting a level difference between reproduced signals at the displacement;
    wherein said reproduction time difference at the point of time, at which the value of said level difference between reproduced signals detected by said level difference detecting means is within a predetermined region is used as the reference value for the tracking control in said reference value forming means.

11. A tracking error signal forming circuit according to claim 10, wherein said displacement means for displacing said electro-mechanical converting element changes the amount of the displacement every time when the play back head scans a predetermined number of recorded tracks.

12. A tracking error signal forming circuit according to claim 10, wherein said level difference detecting means compares level differences of the reproduced signals, corresponding to the timing of changing the amount of the displacement of said electro-mechanical converting element and outputs a direction judgement signal for judging in which direction, left or right, the play back head is deviated with respect to the recorded track, and said track deviation calculating means controls the amount of the displacement of said electro-mechanical converting element, depending on said direction judgement signal.

13. A tracking error signal forming circuit according to claim 1, wherein when the mode passes from a tape stop mode to the normal reproduction, said reference value for said tracking control is rewritten.

14. A tracking error signal forming circuit according to claim 10, wherein said reference value forming means includes means for calculating the difference between said reproduction time difference at the point of time, at which the maximum value of the reproduced signal is detected by said maximum value detecting means, and a fixed reference value, or the sum thereof.

15. A tracking error signal forming circuit according to claim 10, wherein at the normal reproduction mode a process is effected so that the reference value for the tracking control is rewritten for every predetermined period of time.

16. A tracking error signal forming circuit according to claim 10, wherein means for storing the value of the level of the reproduced signal, when the value of the level difference of said reproduced signal is within a predetermined region and a comparing circuit, which compares magnitudes of said value of the level, which is stored, and the value of the level of the reproduced signal at an arbitrary point of time are provided, wherein a process is effected so that the reference value for the tracking control is rewritten, when said value of the level of the reproduced signal at an arbitrary point of time is lower by a value greater than a predetermined value than said stored value.

* * * * *